United States Patent [19]
Drieux et al.

[11] Patent Number: 6,092,575
[45] Date of Patent: *Jul. 25, 2000

[54] RIM AND ASSEMBLY OF TIRE AND RING-SHAPED TREAD SUPPORT ON SAME

[75] Inventors: Jean-Jacques Drieux, Volvic; Jean-Charles Lacour; Olivier Muhlhoff, both of Clermont-Ferrand; Jean-Pierre Pompier, Volvic, all of France

[73] Assignee: Compagnie Generale des Etablissements Michelin - Michelin & Cie, Clermont-Ferrand Cedex, France

[ * ] Notice: This patent is subject to a terminal disclaimer.

[21] Appl. No.: 08/787,126

[22] Filed: Jan. 22, 1997

Related U.S. Application Data

[62] Division of application No. 08/464,695, filed as application No. PCT/FR93/01210, Dec. 8, 1993, Pat. No. 5,634,993.

[30] Foreign Application Priority Data

Nov. 12, 1992 [FR] France .................................. 92 15061

[51] Int. Cl.⁷ ........................... B60B 21/02; B60B 21/10; B60C 3/00; B60C 17/06
[52] U.S. Cl. ........................... 152/158; 152/454; 152/520; 152/539; 152/544; 152/548; 152/375; 152/378 R; 152/379.3; 152/379.4; 152/381.3; 152/381.4
[58] Field of Search ................................. 152/375, 378 R, 152/379.3, 379.4, 379.5, 381.3, 381.4, 381.5, 381.6, DIG. 9, 376, 382, 393, DIG. 6, 158, 520, 544, 539, 157, 516, 518, 519, 522, 339.1, 340.1, 548

[56] References Cited

U.S. PATENT DOCUMENTS

| | | | |
|---|---|---|---|
| 464,767 | 12/1891 | Woodward | 152/379.3 X |
| 1,314,930 | 9/1919 | Baker | 152/544 X |
| 1,875,893 | 9/1932 | Shoemaker | 152/378 R |
| 2,868,258 | 1/1959 | Powers | 152/544 X |
| 3,405,755 | 10/1968 | Verdies | 152/381.3 |
| 3,877,503 | 4/1975 | Tangorra et al. | 152/539 X |
| 4,034,790 | 7/1977 | Johannsen et al. | 152/158 |
| 4,248,286 | 2/1981 | Curtis, Jr. et al. | |
| 4,406,316 | 9/1983 | Okamoto | |
| 4,572,265 | 2/1986 | Lescoffit | |
| 4,751,951 | 6/1988 | Dobson | |
| 5,301,728 | 4/1994 | Brown, Jr. et al. | 152/456 X |
| 5,749,982 | 5/1998 | Muhlhoff et al. | 152/158 |
| 5,787,950 | 8/1998 | Muhlhoff et al. | 152/379.5 |

FOREIGN PATENT DOCUMENTS

| | | | |
|---|---|---|---|
| 858514 | 6/1951 | Germany . | |
| 3724658 | 2/1989 | Germany . | |
| 1202501 | 8/1989 | Japan | 152/516 |

*Primary Examiner*—Adrienne C. Johnstone
*Attorney, Agent, or Firm*—Baker Botts, L.L.P.

[57] ABSTRACT

A tire (1), a mounting rim (2) therefor and a circumferentially unstretchable ring (3) for supporting the tread (10) of the tire when running at low or zero pressure. The tire (1) has a radial ply casing (13) on which the points that are furthest apart axially are radially apart close to seats (12B) of outwardly sloping beads (12). The seats (12B) engage sloping seats (23', 23") on the rim (2), which may have at least one mounting well (22), at least one cylindrical portion (21) for receiving the supporting ring (3) and a rim flange (24).

24 Claims, 4 Drawing Sheets

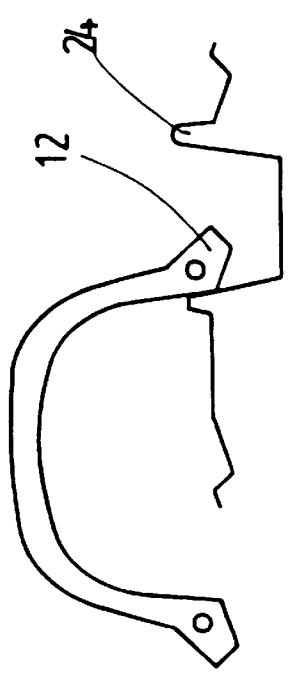
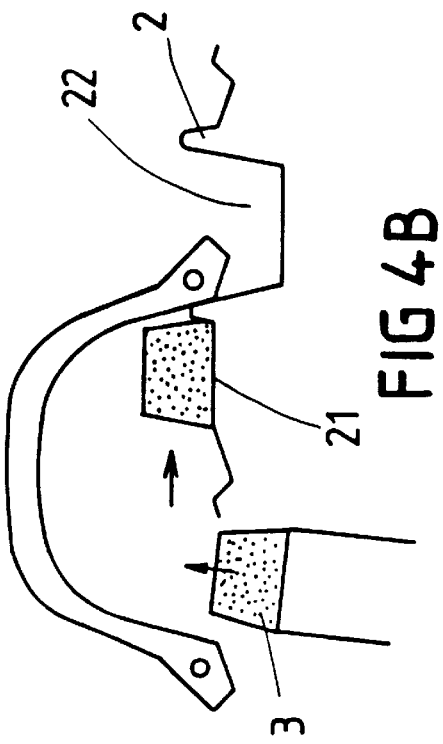
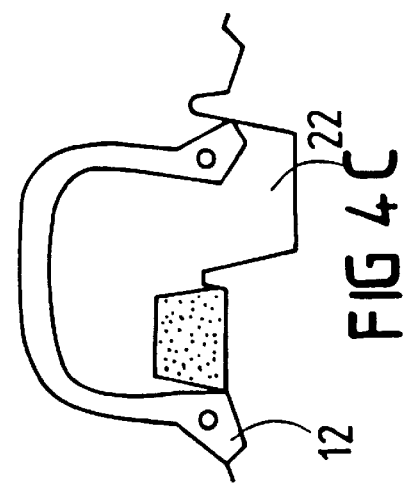
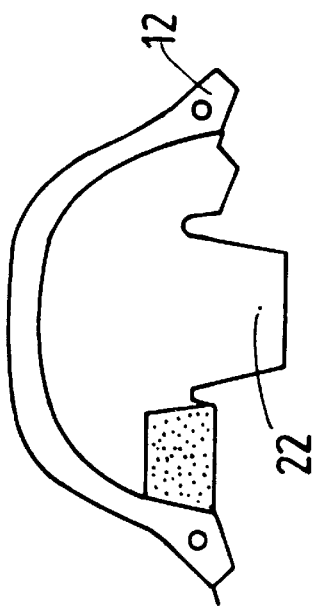
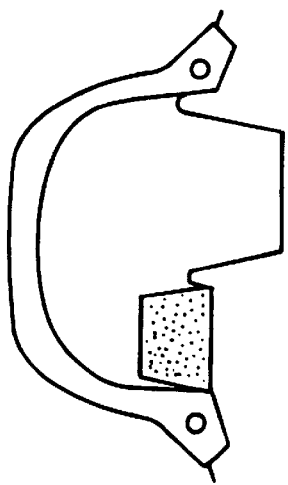

RIM AND ASSEMBLY OF TIRE AND RING-SHAPED TREAD SUPPORT ON SAME

This is a division of application Ser. No. 08/464,695 filed on Jun. 7, 1995 now U.S. Pat. No. 5,634,993, which is a national stage application (371) of International Application PCT/FR93/01210 filed on Dec. 8, 1993 now World Patent Document WO 94/13498.

BACKGROUND OF THE INVENTION

The object of the present invention is the production of assemblies formed of radial carcass tires and mounting rims, preferably "monobloc" rims, at least some of which may prove useful upon travel when the inflation pressure drops abnormally low as compared with the nominal pressure of use, known as the service pressure, the inflation pressure possibly even becoming zero.

The main difficulties encountered in the case of travel with a flat tire or with low pressure in the tire concern the risks of the unseating of the beads of the tire and, in particular, the unseating of the bead located on the outer side of the tire mounted on the outer side of the vehicle. The well-known techniques proposed in order to avoid such unseatings and, in particular, the one which consists of arranging a hump of small height axially to the inside of the outer rim seat, tend to increase the difficulties in mounting and removing the tires.

One solution which can be applied to the problem of the unseating of beads is that described in French Patent 1139619, which concerns an assembly formed of a tire and a rim which are of such a nature that the flexible edges of the tire, contrary to the usual beads, come, under the effect of the inflation pressure, to grip around rim stops intended to hold said edges spaced from each other. This solution requires a carcass reinforcement which is at least special and not in accord with the compromise of properties required for a modern tire.

Certain prior solutions recommend the addition to a rim, such as described above, of a tread support which is integrated or attached and fastened by any available means. Whether this be with hump or without hump, assemblies which comprise rims with tread supports are known, and German application 36 26 012 and French application 2 560 121 show such assemblies. However, they are not of general use, since, despite the advances made, difficult problems of mounting also arise. The above-mentioned French application describes a method of mounting which makes it possible to eliminate numerous difficulties, namely the swinging and ovalizing of one of the beads of the tire permit the passage of the rim, provided with its tread support within the tire, if said rim is presented with its axis of rotation perpendicular to the axis of rotation of the tire, the beads being then placed on their respective rim seats by means of mounting wells arranged axially on opposite sides of the tread support.

If one designates as S the overall width of the mounting rim measured axially between the ends of the two flanges, $D_J$ the diameter of the rim measured at the level of the intersection between the rim flange and the frustoconical generatrix of the rim seat, the latter being seen in meridian section, H' the height of the prop measured with respect to the parallel to the axis of rotation of the rim passing through said point of intersection, and $D_B$ the diameter of the bead of the tire, measured on a parallel to the equatorial plane of the tire, which parallel passes through the center of the bead wire, the method described above cannot be applied in the event that the amount $2\pi D_B$ is less than $2(D_J+2H'+S)$, hence the impossibility of having available tires of customary form ratio which have an effective inner tread support.

The difficulties in the mounting and removal of tires mounted on such rims are further accentuated by the introduction of modern tires with lower form ratio and furthermore frequently comprising greatly reinforced beads.

SUMMARY OF THE INVENTION

In general, the object of the invention is to propose other solutions which make it possible to improve the conditions of operation and use of radial carcass tires in case of travel in degraded manner with zero or low pressure, which solutions concern both the tire and the rim as well as the assembly formed by the tire and rim with or without treat support.

For this purpose, in accordance with a first aspect of the invention, a rolling assembly comprising at least one tire with radial carcass reinforcement anchored in each bead to a reinforcement ring and a rim delimited axially by a first rim edge and a second rim edge and provided with a first rim seat and a second rim seat, is characterized by the fact that, seen in meridian section, a) at least the first rim seat has a generatrix such that the axially outer end of said generatrix is spaced from the axis of rotation by an amount less than the distance from its axially inner end and is delimited axially to the outside by a hump of small height, and by the fact that b) the tire, mounted on the rim and inflated to its service pressure, is provided with a radial carcass reinforcement having a meridian profile of constant direction of curvature, at least in the sidewall and the bead which are located on the same side of the assembly as the first rim seat.

The first rim seat is inclined towards the outside of the assembly.

The assembly, as described above, advantageously comprises at least one rim flange axially adjacent to one of the rim seats, the maximum diameter of said flange being greater than the diameter of any part of the rim contained between said flange and the edge of the rim axially closest to said flange. At least one mounting well can be provided, said mounting well preferably extending one of the rim seats axially to the inside; or, in the case of the presence of a rim flange, said extension preferably extending said flange axially to the inside.

In accordance with a second aspect of the invention, a rolling assembly comprising a tire with radial carcass reinforcement anchored in each bead to a reinforcement ring, a rim delimited axially by a first rim edge and a second rim edge and provided with a first rim seat and a second rim seat and a tread supporting prop is characterized by the fact that, seen in meridian section, a) at least the first rim seat has a generatrix such that the axially outer end of said generatrix is spaced from the axis of rotation by an amount less than the distance from its axially inner end, said rim comprising at least one bearing surface intended to receive a tread support having the shape of a ring, said surface being arranged between the axially inner ends of the two seats and having a generatrix the minimum diameter of which, which is the diameter of one of its ends, is at least equal to the diameter of any part of the rim included axially between said end and the rim edge corresponding to the rim seat axially closest to said end, and by the fact that b) the tire, mounted on the rim and inflated to its service pressure, is provided with a radial carcass reinforcement having a meridian profile of constant direction of curvature, at least in the sidewall and the bead which are located on the same side of the assembly as the first rim seat, and by the fact that c) the annular tread support is ovalizable, preferably circumferentially unstretchable, and adapted to be placed on the rim bearing surface.

By diameter of the bearing surface there is understood the diameter of the portions of said bearing surface which will be in contact with the tread support.

The assembly, in accordance with this second aspect of the invention, may comprise at least one mounting well, located axially between one of the rim seats and the bearing surface intended to receive the tread support. Further in accordance with this second aspect of the invention, the assembly preferably comprises at least the first rim seat, delimited axially towards the outside by a hump of small height. Likewise, the rim of such an assembly can comprise at least one rim flange axially adjacent to one of the rim seats, the maximum diameter of said flange being greater than the diameter of any part of the rim contained between said flange and the edge of the rim axially closest to said flange. The bearing surface, intended to receive the support, may be a portion of revolution, advantageously adjacent, axially towards the inside, to one of the rim seats, the mounting well being located axially between said bearing surface and the rim flange, and the supporting prop, placed on the bearing surface, then serving as axial stop for the bead of the tire which is adjacent to it.

A very good compromise of the properties required by an assembly comprising a tire with radial carcass reinforcement anchored in each bead to a reinforcement ring, a rim delimited axially by a first rim edge and a second rim edge and provided with a first rim seat and a second rim seat, and a tread support, which is in accord with the invention is obtained when the latter is formed a) of a rim having at least the first rim seat the generatrix of which is such that its axially outer end is spaced from the axis of rotation by an amount less than the distance from its axially inner end, and being delimited axially towards the outside by a hump, said rim comprising at least one bearing surface intended to receive a tread support, said bearing surface being axially adjacent towards the inside to the first rim seat and having a generatrix the minimum diameter of which, which is the diameter of one of its ends, is at least equal to the diameter of any part of the rim contained axially between said end and the rim edge corresponding to the first rim seat, while a rim flange axially extends the second rim seat towards the inside, said flange being itself extended axially to the inside by a mounting well, located between said flange and said bearing surface, and b) of a tire which, mounted on the rim and inflated to its service pressure, is provided with a radial carcass reinforcement having a meridian profile of constant direction of curvature, at least in the sidewall and the bead which are located on the same side of the assembly as the first rim seat, and c) of an ovalizable annular tread support, preferably circumferentially unstretchable, which can be placed on the rim bearing surface.

A mounting well serving, possibly, for the mounting of the beads on their respective rim seats has a depth and an axial width which is a function first of all of the axial width of the beads and of the inside diameter of the reinforcement rings, for example the bead wires, and possibly of the width of the portion of revolution or of the tread support.

The depth of the well may, in certain cases, appear excessive in that it greatly decreases the free space intended for the mechanical rolling members. Likewise, the axial width of the mounting well is a well known obstacle to the axial widening of the tread support, when it is advantageous to use it.

In order to minimize said drawbacks, in accordance with another aspect of the invention, a rolling assembly comprising at least one tire with radial carcass reinforcement anchored in each bead to a reinforcement ring, and a rim delimited axially by a first rim edge and a second rim edge and provided with a first rim seat and a second rim seat is characterized by the fact that, seen in meridian section, a) at least the first rim seat has a generatrix such that the axially outer end of said generatrix is spaced from the axis of rotation by an amount less than the distance from its axially inner end, said seats having different diameters, and by the fact that b) the tire, mounted on the rim and inflated to its service pressure, is provided with a radial carcass reinforcement having a meridian profile of constant direction of curvature, at least in the sidewall and the bead which are located on the same side of the assembly as the first rim seat.

In the case of an assembly in accordance with this last-mentioned aspect of the invention, it is also advantageous to provide the rim with a first seat, delimited axially to the outside by a hump of small height. Said assembly can comprise a rim provided with at least one rim flange axially adjacent to one of the rim seats, the maximum diameter of said flange being greater than the diameter of any part of the rim contained between said flange and the edge of the rim axially closest to said flange. The rim flange advantageously extends the rim seat of larger diameter axially towards the inside. The assembly, in accordance with this last aspect of the invention, in which the tire has bead seats of asymmetric diameter, may also advantageously comprise a rim having at least one bearing surface intended to receive a supporting ring, said bearing surface being axially adjacent on the inside to the seat of smaller diameter and having a minimum diameter, which is the diameter of one of its ends, at least equal to the diameter of any part of the rim contained axially between said end and the rim edge corresponding to the rim seat closest axially to said end, and an ovalizable annular tread support, preferably unstretchable circumferentially, which can be placed on the rim bearing surface, said tread support being held in axial position by at least one bead of the mounted tire.

In the assembly in accordance with the last aspect of the invention, the rim can also be provided with a mounting well the depth or height of which may have a smaller value than in the customary cases and which will preferably be axially adjacent on the inside to the rim flange, which in its turn axially extends the seat of larger diameter towards the inside and is contained between the bearing surface and said flange.

The first rim seat of the assembly in accordance with this third aspect of the invention is preferably the seat of smaller diameter. An assembly in accordance with one of the three aspects of the invention may comprise a rim having a second rim seat having a generatrix such that the axially outer end of said generatrix is spaced from the axis of rotation by an amount less than the distance from its axially inner end, said seat being extended axially outward by a hump, and said assembly having a tire, mounted on the rim and inflated to its service pressure, which is provided with a radial carcass reinforcement having a meridian profile of constant direction of curvature over its entire length.

In the case of a rim with seats of different diameters, the invention also covers the combination of at least one bearing surface which is intended to receive a tread support and axially extends the rim seat of smaller diameter towards the inside and a mounting well between said bearing surface and the rim seat of larger diameter.

The diameters of the seats of the rim being different, the diameter of a rim seat being, as known, the diameter of the end thereof which is furthest from the axis of rotation, the diameters of rim humps are accordingly different. The diameter of the larger hump is advantageously greater than the diameter of the other hump by an amount which is between 2.5% and 10% of the smaller diameter. The tire intended to be mounted on such a rim is normally asymmetrical with respect to the diameters of its beads, and of its anchoring bead wires.

The rims seats advantageously have, in all the cases previously mentioned, frustoconical generatrices which form an angle $\alpha'$ of between 4° and 30° with the axis of rotation. Likewise, the inner wall or walls of the hump or humps will preferably be frustoconical.

The rim bearing surface on which the support will be placed may advantageously have the shape of a cylindrical bearing surface; its minimum diameter D may advantageously be equal to the nominal diameter of the rim. Likewise, it is of interest to provide on its axially inner edge a positioning hump which serves on the inside as stop for the supporting ring. The mounting well can then be placed between said hump and a rim flange adjacent to the seat opposite the one around which the supporting ring can be placed.

The axial width L contained between this positioning hump and the axially outer hump, corresponding to the seat adjacent to the bearing surface, is advantageously at most equal to half the maximum width S of the rim, contained between the two rim edges.

The height of the axially outer hump or humps is advantageously at most equal to 1.25% of the nominal diameter of the mounting rim.

The tire of the assembly preferably has a radial carcass reinforcement with a meridian profile the tangent or tangents AT of which at the point or points of tangency A of said profile with the reinforcement ring or rings of the bead or beads forms or form with the axis of rotation an angle or angles $\phi$ open towards the outside of at least 70°, and preferably more than 80°, such a carcass reinforcement profile making it possible to modify the transverse stiffnesses of the tire and to modify the parameters of the compromise which determine the performances of said tire.

A better seat of the bead, mounted on the side of the rim where the latter has a rim flange, is obtained if the axially outer face of said flange forms an angle $\theta$ of between 0° and 15° with a perpendicular to the axis of rotation. This seat can also be obtained, particularly in the event that the two rim seats slope outwardly, by the inclination towards the inside of the tire of the trajectory of the carcass reinforcement in the bead; stated differently, the tangents to the meridian profile of the carcass reinforcement at the points where said profile is tangent to the bead reinforcement rings are inclined with respect to the axis of rotation by angles $\phi$, open towards the outside, of more than 90°, the line of greatest axial width being substantially the axial line joining the centers of gravity of the two bead reinforcement rings.

In a tire which is advantageous for the carrying out of the invention, the tip of the bead, intended to be mounted on the first rim seat, may be truncated, or, stated differently, the seat or base of the bead will be connected to the bead on the tip side by a straight-line segment inclined with respect to a parallel to the axis of rotation by an angle, open radially and axially towards the outside, of less than 90°, and preferably equal to 45°±5°, the bead tip being axially on the outside of the tire, while the bead heel is towards the inside. The latter may also advantageously be truncated. If the two rim seats slope outwardly, the tips and heels of the two beads will preferably be truncated.

On the heel side, the corresponding portion of the mounting rim may have the shape of a circular arc connecting the frustoconical seat to the flange; the outer hump may have a face inclined 45°±5° with respect to the axis of rotation in order to receive the truncated tip of the bead.

The beads are mounted on the rim, and in particular on the frustoconical rim seats, with a certain clamping. This clamping is defined, in the case of the assembly in question, as being the ratio between the minimum diameter $D_M$ of the rim seat and the minimum diameter $D_I$ of the bead seat. This clamping will preferably be equal to at least 1.003, while remaining less than 1.02.

By circumferentially unstretchable supporting prop there is understood a prop having, under tensile stress, a relative circumferential elongation of at most 0.5%.

Furthermore, good efficiency of the assembly according to the invention is obtained for high heights of the supporting prop, preferably greater than 40% of the height of the carcass reinforcement. This feature offers the advantage of prolonging travel flat, that is to say with zero inflation pressure, without, in the case of an ordinary structure of the sidewalls of the tire, causing failures at the level of the sidewalls, of the carcass reinforcement, and even of the overhead reinforcement.

The annular supporting prop can be placed on easily due to the special characteristics of the mounting rim and if its minimum inside diameter is selected at least equal to the minimum diameter D of the rim bearing surface and at most 2 mm greater than said diameter, its inner generatrix being parallel to the generatrix of the bearing surface.

The tread support, which is ovalizable and circumferentially unstretchable, is preferably formed of a rubber composition vulcanizate in annular form, said vulcanizate being reinforced by reinforcements of cords or cables arranged circumferentially, plus or minus 2°. Such a construction permits easy handling, while assuring unstretchability under all conditions of rolling and in particular under the effect of the centrifugal forces due to the high velocity.

In addition to the fact that the assembly in accordance with the invention solves the problem of unseating of the beads while minimizing the problems of mounting the tires in all the cases which ordinarily occur, the special structure of the tire, and, more particularly, of the beads of the tire, offers other advantages.

In fact, while the ovalizing of the beads of a tire is an operation which is necessary for the mounting of said tire and although the constitution of certain bead reinforcement rings, in particular bead wires of "braided" type, permits easy ovalizing, this measure must not exceed certain limits. In particular, too extensive an ovalizing, as in the case of the prior art described, strongly affects the stiffness of a bead wire, whether under the effect of traction, edge bending, or bending in a plane, which, in certain cases of the tire results, upon rolling, in poorer properties of non-unseating, seal, and fatigue strength of the beads and resistance to blow-out. These properties are preserved by the invention.

Whether in the case of a symmetrical assembly or an asymmetric assembly in diameters, it is advisable to provide that the tread support will serve as stop or flange at least for the outer bead of the tire mounted on the vehicle, said bead being, of course, the most likely to unseat, and the outer side of the mounted tire being the most affected by degradation in the case of travel with zero or low pressure and with strong drift.

DESCRIPTION OF THE DRAWINGS

The invention will be better understood by reference to the accompanying drawing, which illustrates non-limitative embodiments of a 185/33-16 tire mounted on a rim of a diameter of 406.4 mm, in which drawing

FIGS. 4A to 4E show, very diagrammatically, the principle of the mounting of the tire and of the tread support on the mounting rim.

DESCRIPTION OF PREFERRED EMBODIMENTS

Figure 1:
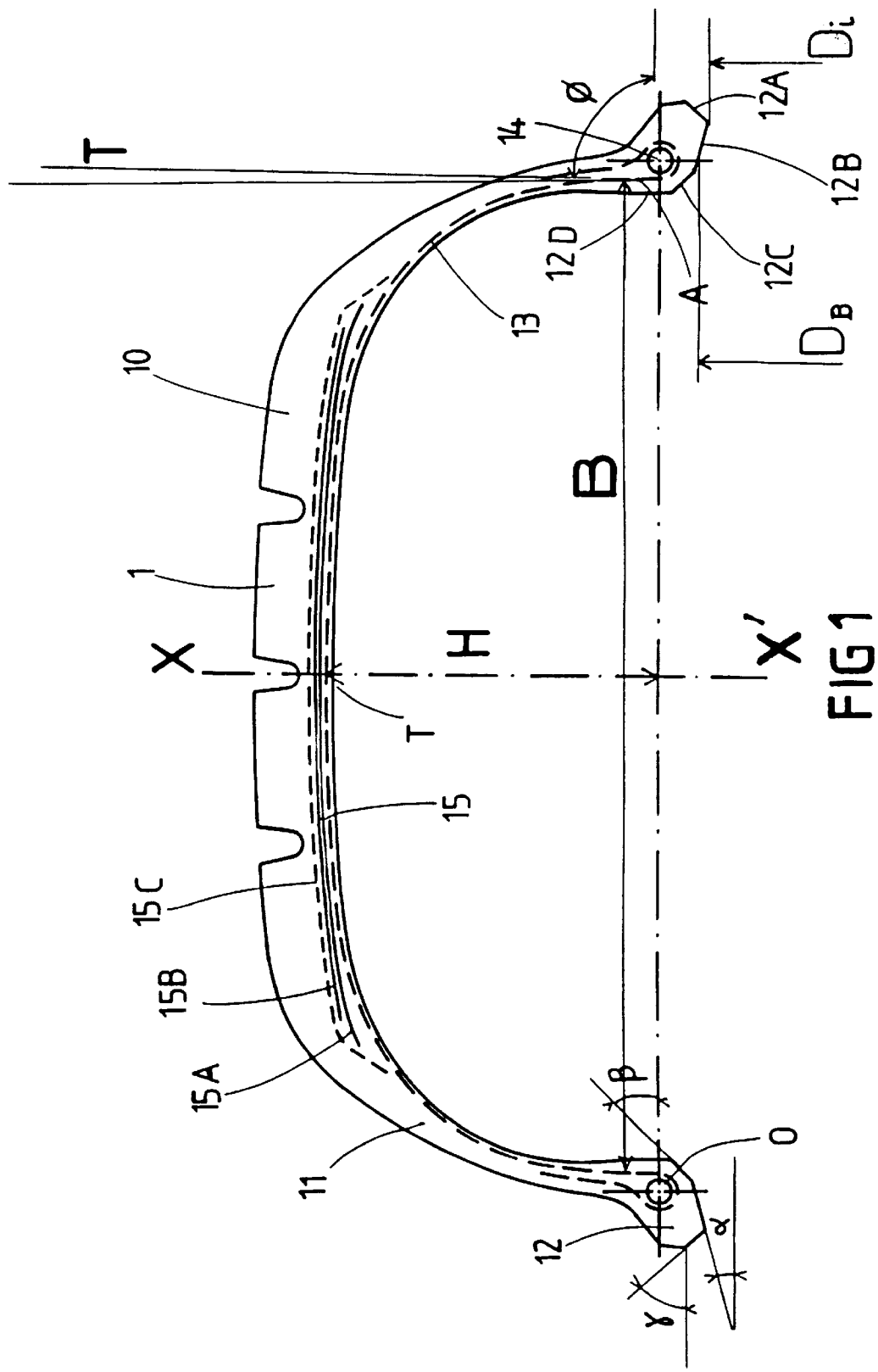
FIG. 1 is a meridian section through the tire of an assembly in accordance with the invention.

Referring to FIG. 1, the tire 1 comprises a tread 10, connected by means of two sidewalls 11 to two beads 12. It is reinforced by a radial carcass reinforcement 13 formed of a single ply of textile cables which is anchored in each bead 12 by turning up around a bead wire 14 which, in the example shown, is a bead wire of "braided" type. Over the carcass reinforcement 13 there is radially arranged an overhead reinforcement 15 formed, on the one hand, of two superposed plies 15A and 15B of metal cables crossed from one ply to the next, forming an angle of 22° with the circumferential direction and, on the other hand, arranged radially to the outside of said metal reinforcement of a ply 15C of textile cables arranged circumferentially, or substantially circumferentially, that is to say within the range of +2°, −2°.

The tire 1 has a form ratio which is preferably less than 0.4 and, more precisely, equal to 0.33 in the example described. By form ratio there is to be understood the ratio H/B of the carcass reinforcement, H being the height of the carcass reinforcement 13 and B its maximum axial width. The height H is the radial distance between the point T of the carcass reinforcement furthest from the axis of rotation and the axial line axially connecting the centers of gravity O of the cross sections of bead wires 14; it is equal to 62 mm. The maximum axial width B is equal to 185 mm and is measured on an axial line which is radially very close to the axial line connecting the two bead wires 14. In fact, the carcass reinforcement 13 is tangent to the bead wire 14 at a point A through which there passes a straight line parallel to the axis of rotation of the assembly in accordance with the invention. At this point A, the tangent AT to the meridian profile of the carcass reinforcement 13 forms an angle $\phi$ of 85° open towards the outside with the above parallel line.

Each bead 12, of an axial width comparable to the known, customary widths of beads, has an outer contour which is formed primarily of a bead tip the outer face 12A of which forms an angle $\gamma$, radially and axially open towards the outside, of 45°±5° with the axis of rotation, said face 12A being extended axially towards the inside by a bead seat with frustoconical base 12B forming, with the axis of rotation, an angle $\alpha$, open axially towards the inside and radially towards the outside, of between 10° and 45° and greater than the angle $\alpha'$, which is the angle of the bead seat 23 (FIG. 2), by an amount of between 6° and 15° and the minimum diameter $D_I$ of which, measured in a plane parallel to the equatorial plane XX', is equal to 394 mm.

The seat 12B is extended axially towards the inside by a frustoconical generatrix 12C corresponding to the heel of the bead, forming with the axis of rotation an angle $\beta$, open axially towards the inside and radially towards the outside, of 45°+5° and extended towards the inside by a wall 12D which is substantially perpendicular to the axis of rotation.

The rim 2, of axial width S (FIG. 2) measured between its ends which are axially furthest from the equatorial plane XX', is formed, extending from one edge to the other, by a hump 25' the inner face of which forms with the axis of rotation an angle $\gamma'$, equal to the angle $\gamma$ of the tip of the bead 12 of the tire 1, the diameter $D_S$ of which, equal to 402 mm, is less than the interior diameter $D_T$ of the reinforcement bead wire 14, and the height $h_1$ of which, measured with respect to the axially outer end of the rim seat 23', is at most equal to 1.25% of the nominal diameter D, said diameter D, which is the diameter of the axially inner ends of the rim seats 23', 23" being equal to 406.4 mm.

The rim seats 23', 23" have frustoconical shapes the generatrices of which form with the axis of rotation an angle $\alpha'$, open towards the inside of the tire, of between 4° and 30°, and in the example described equal to 14° and therefore 8° less than the angle $\alpha$ of the corresponding generatrices of the bead seats 12 of the tire, equal to 22°. On one of the sides of the assembly, the seat 23" is connected to the axially outer wall of the rim flange 24, said wall forming with a perpendicular to the axis of rotation a small angle $\theta$ of 5° and the maximum diameter $D_F$ of which is 432 mm, and greater than the diameter D. On the other side with respect to the equatorial plane XX', the rim seat 23' is directly connected to a cylindrical bearing surface 21 on which the supporting ring-shaped tread support 3 will rest. This bearing surface 21 is provided axially to the inside with a hump 26 for the transverse positioning of the prop 3. The height $h_2$ of this hump, at most equal to 1.5% of the nominal diameter D of the rim 2, is equal to 5 mm in the example. The axial distance L, measured between the end of the hump 25' and the inner face of the hump 26, is equal to 103 mm, which amount is less than half the width S of the rim 2, which is equal to 215 mm.

The axially inner faces of the positioning hump 26 and the rim flange 24 respectively define axially the mounting well 22, the depth h' of which is 50 mm, this height h' being measured radially from the axial line defining the nominal diameter D of the rim.

As for the annular prop 3, its meridian section has a shape close to that of a rectangle the radially inner side of which is linear, while the lateral sides and the radially outer side may be slightly curved. The difference H' between its inner radius and its outer radius is equal to 31 mm, which represents 50% of the height H of the tire 1.

It is formed of a rubber vulcanizate 30 which is reinforced radially on the inside and radially on the outside by two reinforcements 31 and 32 respectively, each formed of two layers of textile cables oriented circumferentially, plus or minus 2°.

Figure 2:
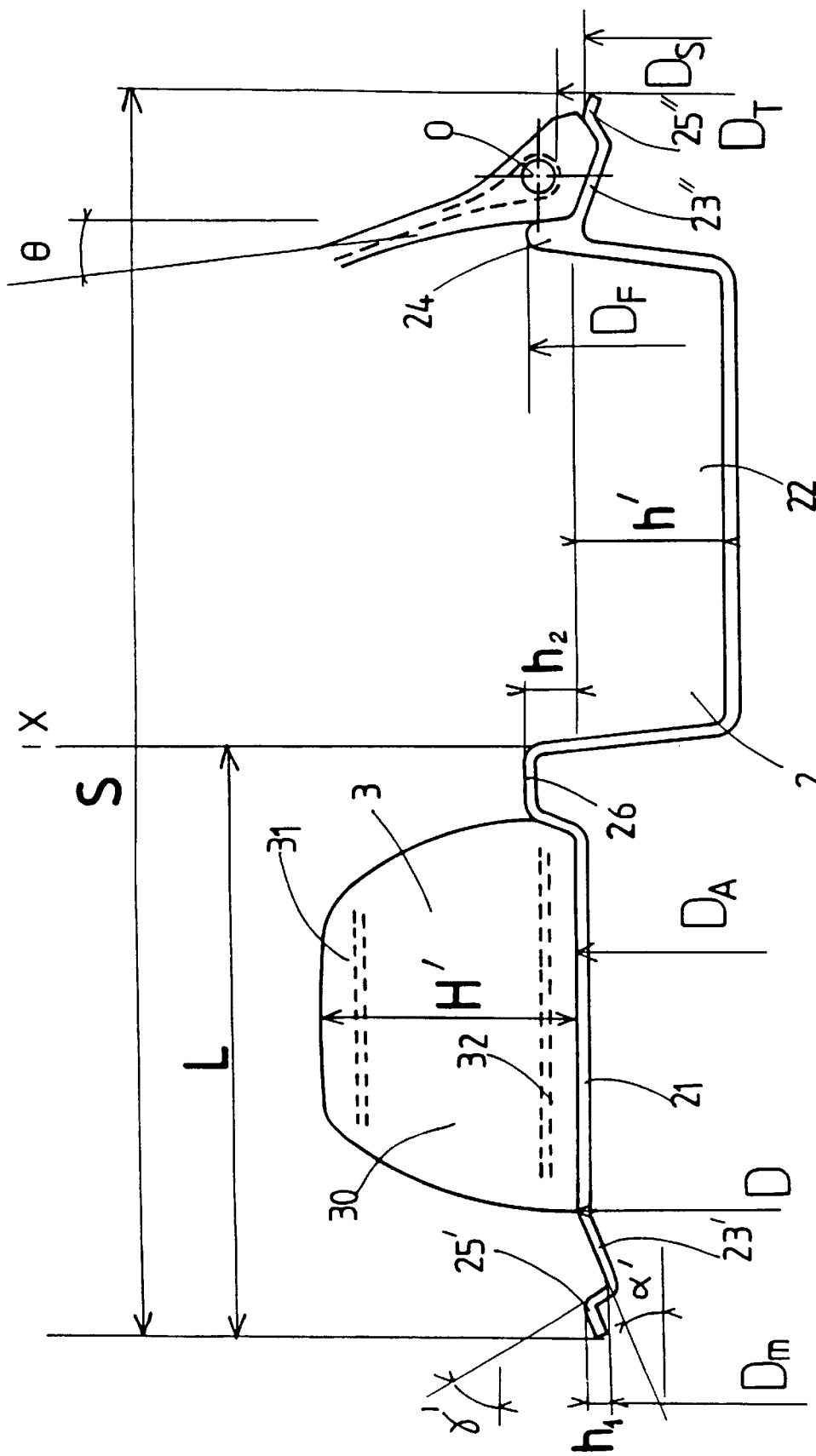
FIG. 2 is a meridian section through the mounting rim of the assembly, on which a tread support in accordance with the invention is mounted.
Figure 3:
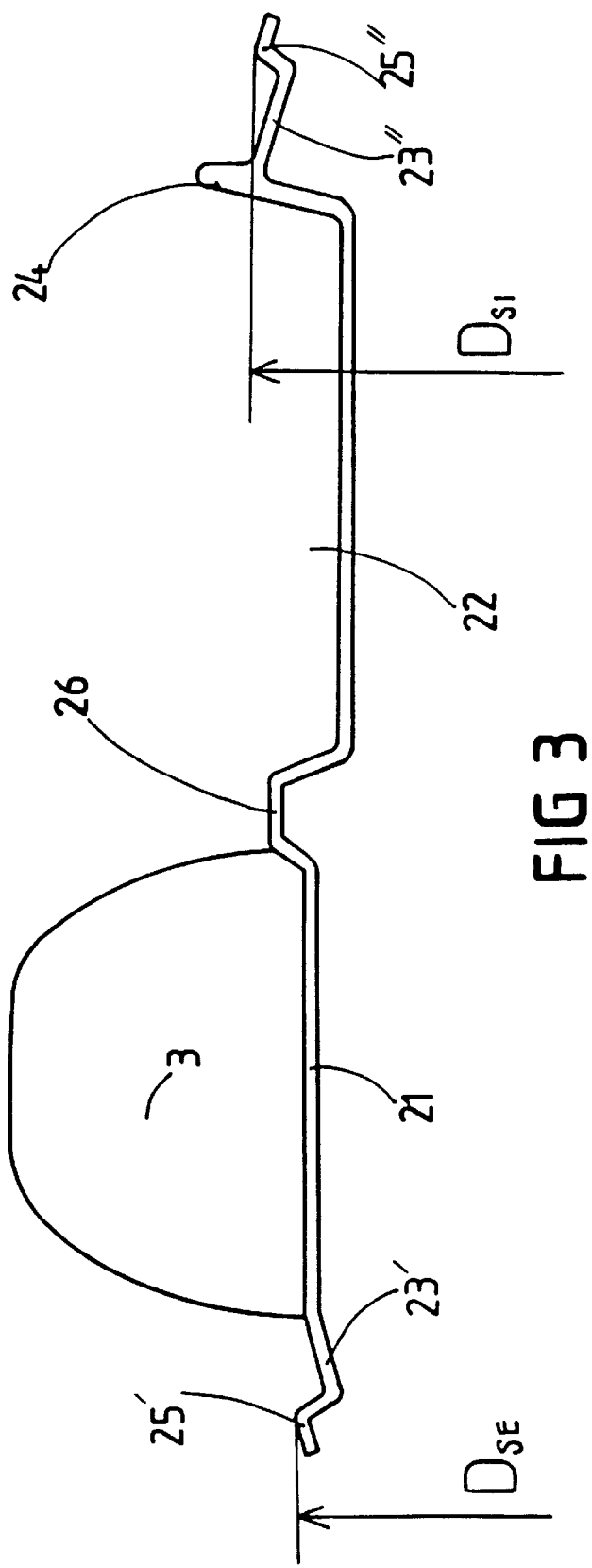
FIG. 3 is a meridian section through a variant of the assembly concerning the asymmetry present between the diameters of the humps of the mounting rim.

The variant in accordance with the invention which is shown in FIG. 3 differs from that shown in FIG. 2 only by the asymmetry in the respective diameters of the humps (25', 25"), of the rim seats (23', 23"), and of the corresponding bead seats.

One of the humps 25" has a diameter $D_{SI}$ which is greater by an amount $\Delta S$ than the diameter $D_{SE}$ of the opposite hump 25' of the mounting rim. The amount $\Delta S$, equal to 16 mm, that is to say to 4% of the diameter $D_{SE}$, is small but nevertheless makes it possible to be able to reduce the height h' of the mounting well of 35 mm, as compared with the height h' corresponding to the case of symmetrical rim and tire, this height h' being measured with respect to the cylindrical generatrix of diameter D, the nominal diameter of the rim and diameter of the cylindrical bearing surface 21 axially adjacent on the outside to the frustoconical seat 23' provided with the hump 25' of smaller diameter $D_{SE}$.

The method of mounting, indicated diagrammatically in FIGS. 4A to 4E, breaks down, for the example described, into the following steps:

a) the first bead 12 is mounted on the side opposite the side having the rim flange 24 as shown in the diagram of FIG. 4A;

b) said first bead being brought close to the inner face of the mounting well 22, the ovalized tread support 3 is introduced, whereupon it is placed on the cylindrical bearing surface 21 of the rim 2 (FIG. 4B);

c) the second bead 12 is then mounted, the first bead being then within the mounting well 22 (FIG. 4C);

d) the mounting is completed by moving the first bead 12 out of the mounting well 22 towards the outside of the rim (FIG. 4D);

e) then by placing said bead on the corresponding rim seat in order to arrive at the assembly formed in accordance with the invention (FIG. 4E).

What is claimed is:

1. A rim, intended for the mounting of a tire having two reinforced beads, delimited axially by two rim edges, spaced axially apart by the rim width, comprising, seen in meridian section and axially toward the outside, a first rim seat and a second rim seat having equal diameters, said first rim seat and said second rim seat each having a generatrix the axially outer end of which is on a circle of diameter less than the diameter of the circle on which the axially inner end is located, said first rim seat and said second rim seat each being extended axially to the outside by a hump, a bearing surface for receiving a tread supporting ring to be engaged therearound, said bearing surface being disposed between the axially inner ends of the two seats, axially adjacent the inside of the first rim seat, and having a generatrix with a minimum diameter, which is the diameter of one of its ends, at least equal to the diameter of any part of the rim contained axially between said end and the rim edge corresponding to the rim seat axially closer to said end, and a rim flange which extends the second rim seat axially to the inside, the maximum diameter of said flange being greater than the diameter of any part of the rim contained between said flange and the edge of the rim axially closest to said flange.

2. A rim according to claim 1, in which a mounting well is located between said flange and said bearing surface.

3. A rim according to claim 2, characterized by the fact that the bearing surface has a cylindrical generatrix of diameter equal to the nominal diameter of the rim.

4. A rim according to claim 2, characterized by the fact that the bearing surface comprises on its axially inner edge a positioning hump, said hump serving, on the inside, as a stop for the tread supporting ring and delimiting, with the rim flange, the mounting well.

5. A rim according to claim 4, characterized by the fact that the axial width between the positioning hump and the axially outer rim edge corresponding to the first rim seat connected to the bearing surface is at most equal to one half of the maximum width of the rim.

6. A rim, intended for the mounting of a tire having two reinforced beads, delimited axially by two rim edges, spaced axially apart by the rim width, comprising, seen in meridian section and axially toward the outside, a first rim seat and a second rim seat having equal diameters, said first rim seat and said second rim seat each having a generatrix the axially outer end of which is on a circle of diameter less than the diameter of the circle on which the axially inner end is located, said first rim seat and said second rim seat each being extended axially to the outside by a hump, a bearing surface for receiving a tread supporting ring to be engaged therearound, said bearing surface being disposed between the axially inner ends of the two seats, axially adjacent the inside of the first rim seat, and having a generatrix with a minimum diameter, which is the diameter of one of its ends, at least equal to the diameter of any part of the rim contained axially between said end and the rim edge corresponding to the rim seat axially closer to said end, and a mounting well located axially between the second rim seat and the bearing surface designed to receive the supporting ring.

7. A rim, intended for the mounting of a tire having two reinforced beads with truncated bead tips, said rim being delimited axially by two rim edges, spaced axially apart by the rim width, comprising, seen in meridian section and axially toward the outside, a first rim seat and a second rim seat having equal diameters, said first rim seat and said second rim seat each having a generatrix the axially outer end of which is on a circle of diameter less than the diameter of the circle on which the axially inner end is located, said first rim seat and said second rim seat each being extended axially to the outside by a hump, and a bearing surface for receiving a tread supporting ring to be engaged therearound, said bearing surface being disposed between the axially inner ends of the two seats, axially adjacent the inside of the first rim seat, and having a generatrix with a minimum diameter, which is the diameter of one of its ends, at least equal to the diameter of any part of the rim contained axially between said end and the rim edge corresponding to the rim seat axially closer to said end, and in which the humps have frustoconical axially inner walls which form with the axis of rotation an angle of between 40° and 50° and equal to the angle which the truncated bead tips of the tire form with the axis of rotation.

8. An assembly of a rim and a tread supporting ring, said rim being intended for the mounting of a tire having two reinforced beads, delimited axially by two rim edges, spaced axially apart by the rim width, comprising, seen in meridian section and axially towards the outside, a first rim seat and a second rim seat having equal diameters, at least the first rim seat having a generatrix the axially outer end of which is on a circle of diameter less than the diameter of the circle on which the axially inner end is located, said first rim seat being extended axially to the outside by a hump, a bearing surface designed to receive a tread supporting ring to be engaged therearound, said bearing surface being disposed between the axially inner ends of the two seats, axially adjacent the inside of said first rim seat, and having a generatrix with a minimum diameter, which is the diameter of one of its ends, at least equal to the diameter of any part of the rim contained axially between said end and the rim edge corresponding to the rim seat axially closer to said end, and a tread support ring mounted on said bearing surface and having a side wall adjacent said first rim seat so that it serves as a lateral stop for the bead of the tire which is intended to be mounted on the first rim seat.

9. An assembly according to claim 8, characterized by the fact that the second rim seat has a generatrix the axially outer end of which lies on a circle of a diameter less than the diameter of the circle on which the axially inner end is located, the second rim seat being extended axially to the outside by a hump.

10. An assembly according to claim 9, characterized by the fact that the rim is provided with a mounting well which is located axially between the second rim seat and the bearing surface.

11. An assembly according to claim 9, characterized by the fact that the rim seats have frustoconical generatrices which form with the axis of rotation an angle of between 4° and 30°, less than the angle which frustoconical generatrices of the bead seats of the tire form with the axis of rotation.

12. An assembly according to claim 9, for a tire which has truncated bead tips, in which the humps have frustoconical axially inner walls which form with the axis of rotation an angle of between 40° and 50° and equal to the angle which the truncated bead tips of the tire form with the axis of rotation.

13. An assembly according to claim 9, characterized by the fact that it comprises a rim flange which extends the second rim seat axially to the inside, the maximum diameter of said flange being greater than the diameter of any part of the rim contained between said flange and the edge of the rim axially closest to said flange.

14. An assembly according to claim 13, characterized by the fact that the rim comprises a mounting well which extends the rim flange axially toward the inside.

15. An assembly according to claim 14 characterized by the fact that the bearing surface has a cylindrical generatrix of diameter equal to the nominal diameter of the rim.

16. An assembly according to claim 15, characterized by the fact that the bearing surface comprises on its axially inner edge a positioning hump, said hump serving, on the inside, as a stop for the tread supporting ring and delimiting, with the rim flange, the mounting well.

17. An assembly according to claim 16, characterized by the fact that the axial width between the positioning hump and the axially outer rim edge corresponding to the first rim seat connected to the bearing surface is at most equal to one half of the maximum width of the rim.

18. A rolling assembly comprising a tire with radial carcass reinforcement anchored in each bead to a reinforcement ring, a rim, delimited axially by a first rim edge and a second rim edge and provided with a first rim seat and a second rim seat, and an ovalizable and circumferentially unstretchable tread supporting ring, characterized by the fact that, seen in meridian section, a) at least the first rim seat has a generatrix the axially outer end of which lies on a circle of a diameter less than the diameter of the circle on which the axially inner end is located, the two rim seats having equal seat diameters, and a hump being disposed between the axially outer end of the first rim seat and the corresponding rim edge; and b) the rim has a bearing surface for receiving the tread supporting ring, which bearing surface is arranged between the axially inner ends of the two seats and having a generatrix with a minimum diameter, which is the diameter of one of its ends, at least equal to the diameter of any part of the rim contained axially between said end and the rim edge corresponding to the rim seat closest axially to said end; and c) the tire, mounted on the rim and inflated to its service pressure, is provided with said radial carcass reinforcement having a meridian profile of constant direction of curvature, at least in the sidewall and the bead which are located on the same side of the assembly as the first rim seat, the bead seats having equal diameters;

d) the tread supporting ring is on the bearing surface.

19. A rolling assembly according to claim 18, characterized by the fact that the bearing surface is axially adjacent towards the inside of the first rim seat, while a rim flange axially extends the second rim seat towards the inside, said flange being itself extended axially to the inside by a mounting well, located between said flange and said bearing surface, a side wall of the supporting ring serving as a lateral stop for the bead of the tire which is mounted on the first seat of the rim.

20. An assembly according to claim 18, characterized by the fact that the tire, mounted on the rim and inflated to its service pressure, is provided with said carcass reinforcement having a meridian profile which, at least in the bead mounted on the first rim seat, is such that a tangent AT to the point of tangency A of said profile with the reinforcement ring of said bead forms, with the axis of rotation, an angle, open towards the outside, of at least 70°.

21. An assembly according to claim 18, characterized by the fact that the height of the ring is at least 40% of the height H of the carcass reinforcement of the tire, the tire having a form ratio H/B less than 0.4, B being the maximum width of the carcass reinforcement.

22. An assembly according to claim 21, characterized by the fact that the ring is a rubber vulcanizate reinforced by reinforcements of at least two layers of cables oriented circumferentially within a range of plus or minus 2°.

23. An assembly according to claim 21, characterized by the fact that the minimum inside diameter of the tread supporting ring is at least equal to the diameter of the bearing surface and is at most 2 mm greater than said diameter, the inner generatrix of said ring being parallel to the generatrix of the bearing surface.

24. An assembly according to claim 18, characterized by the fact that the second rim seat has a generatrix the axially outer end of which lies on a circle of diameter less than the diameter of the circle on which the axially inner end is located, said second rim seat being extended axially to the outside by a hump, and by the fact that the tire, mounted on the rim and inflated to its service pressure, is provided with said radial carcass reinforcement having the meridian profile of constant direction of curvature over its entire length.

* * * * *

UNITED STATES PATENT AND TRADEMARK OFFICE
CERTIFICATE OF CORRECTION

PATENT NO. : 6,092,575

DATED : July 25, 2000

INVENTOR(S) : Drieux et al.

It is certified that error appears in the above-identified patent and that said Letters Patent is hereby corrected as shown below:

In the Claims:

Column 11, line 34: "claim 15," should read -- claim 14,--

Signed and Sealed this

Twenty-ninth Day of May, 2001

Attest:

NICHOLAS P. GODICI

*Attesting Officer*     *Acting Director of the United States Patent and Trademark Office*